United States Patent
Koehl et al.

(10) Patent No.: US 12,065,033 B2
(45) Date of Patent: Aug. 20, 2024

(54) DEVICE FOR FASTENING A TANK TO A VEHICLE

(71) Applicant: FAURECIA SYSTEMES D'ECHAPPEMENT, Nanterre (FR)

(72) Inventors: Jean-Philippe Koehl, Bavans (FR); Damien Fleche, Roppe (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 182 days.

(21) Appl. No.: 17/869,823

(22) Filed: Jul. 21, 2022

(65) Prior Publication Data
US 2023/0032196 A1 Feb. 2, 2023

(30) Foreign Application Priority Data

Jul. 27, 2021 (FR) ...................................... 21 08136

(51) Int. Cl.
*B60K 15/07* (2006.01)
*B60K 15/067* (2006.01)

(52) U.S. Cl.
CPC ...... *B60K 15/07* (2013.01); *B60K 2015/0675* (2013.01)

(58) Field of Classification Search
CPC .................. B60K 15/07; B60K 2015/0675
USPC ........................................................ 280/830
See application file for complete search history.

(56) References Cited

U.S. PATENT DOCUMENTS

2016/0097487 A1* 4/2016 Sasaki ................. F17C 13/084
248/505

FOREIGN PATENT DOCUMENTS

| CN | 107472009 A | * | 12/2017 | ............. B60K 15/07 |
|---|---|---|---|---|
| CN | 109080452 A | * | 12/2018 | |
| CN | 113580926 A | * | 11/2021 | ............. B60K 15/07 |
| DE | 102011014334 A1 | * | 9/2012 | ............. B60K 15/07 |
| EP | 3369600 A1 | | 9/2018 | |
| FR | 3099094 A1 | | 1/2021 | |
| KR | 101837346 B1 | * | 4/2018 | |
| WO | 2018030931 A1 | | 2/2018 | |

OTHER PUBLICATIONS

KR-101837346-B1 (Kim No Jun) (Apr. 19, 2018) (Machine Translation) (Year: 2018).*
French Preliminary Search Report for Application No. FR 2108136 dated Apr. 12, 2022.

* cited by examiner

*Primary Examiner* — Mahmoud Gimie
(74) *Attorney, Agent, or Firm* — Carlson, Gaskey & Olds, P.C.

(57) ABSTRACT

A device for fastening a tank to a vehicle is provided. The tank is substantially in the form of a cylinder with an axis arranged substantially horizontally. The device comprises at least two substantially identical, substantially flat frames, substantially perpendicular to the axis, comprising an opening presenting a shape substantially identical to a section perpendicular to the axis of the tank so as to be able to enclose, at least partially, the tank. The device further includes a fastening interface to the vehicle and an impact energy dissipation feature that dissipates impact energy transmitted to the tank according to a substantially horizontal direction substantially perpendicular to the axis. The impact energy dissipation features is arranged between the opening and the fastening interface.

16 Claims, 6 Drawing Sheets

DEVICE FOR FASTENING A TANK TO A VEHICLE

CROSS-REFERENCE TO RELATED APPLICATIONS

This application is a U.S. non-provisional application claiming the benefit of French Application No. 21 08136, filed on Jul. 27, 2021, which is incorporated herein by reference in its entirety.

TECHNICAL FIELD

The disclosure relates to a device for fastening a cylindrical tank to a vehicle. Such a tank is, for example, a pressurized gas tank, such as hydrogen, used to produce electricity for the vehicle's motorization.

BACKGROUND

It is known to carry a pressurized gas tank, such as hydrogen, on board a vehicle, such as a truck. Various fastening devices are possible.

It is known that pressurized gas tanks are substantially cylindrical in shape, with two hemispherical caps at each end of the cylinder.

Given the volume of the tank, it is envisaged that the tank will be arranged horizontally on one of the sides of the vehicle, for example along a chassis member. With such an arrangement, on the periphery of the vehicle, the tank is potentially subject to an impact with another vehicle.

In order to reduce potential leakage of the pressurized gas due to an impact load, the tank should be protected.

SUMMARY

The subject disclosure provides a fastening device capable of deformation and/or breakage. The purpose of this deformation and/or breakage is, on the one hand, to dissipate the energy of the impact suffered by the tank and, on the other hand, to move the tank into a protected area, for example under the vehicle. Secondly, the fastening device maintains a certain rigidity in order to form a rigid cage around the tank in order to protect the tank.

The disclosure relates to a device for fastening a tank to a vehicle. The tank presents a substantially cylindrical shape according to an axis that is arranged substantially horizontally. The device comprises at least two substantially identical, substantially flat frames substantially perpendicular to the axis, comprising an opening presenting a shape substantially identical to a section of the tank perpendicular to the axis, so as to be able to enclose, at least partially, the tank. The device further comprises a fastening interface to the vehicle and an impact energy dissipation feature to dissipate impact energy transmitted to the tank according to a substantially horizontal direction and substantially perpendicular to the axis. The impact energy dissipation feature is arranged between the opening and the fastening interface.

Particular features or embodiments, usable alone or in combination, are:
  the fastening interface is not arranged in the horizontal plane through the axis and is preferably arranged above the axis,
  the dissipation feature dissipates the energy by deformation and/or breakage,
  the dissipation feature comprises a weakened zone of at least one frame between the opening and the fastening interface,
  the weakened zone follows a line separating the opening of the fastening interface,
  the line runs from one edge of the frame to the other and is secant, preferably substantially perpendicular, to a line joining the fastening interface to the axis,
  the line is substantially bisecting an angle formed by a tangent to the opening and a vertical line passing through the fastening interface,
  the line is substantially circular centered on the axis,
  the weakened zone comprises holes substantially parallel to the axis, arranged along the line, preferably through, preferably regularly distributed,
  an opening is incomplete in that the opening does not completely enclose the tank and the device comprises a strap completing the opening,
  the device also comprises a shield, connecting the two frames, preferably vertical.

In a second aspect of the disclosure, a vehicle comprising a pressurized gas tank, wherein the tank is attached to the vehicle by such a fastening device.

BRIEF DESCRIPTION OF THE DRAWINGS

The disclosure will be better understood from the following description, made only by way of example, and with reference to the appended figures in which.

DETAILED DESCRIPTION

Figure 1:
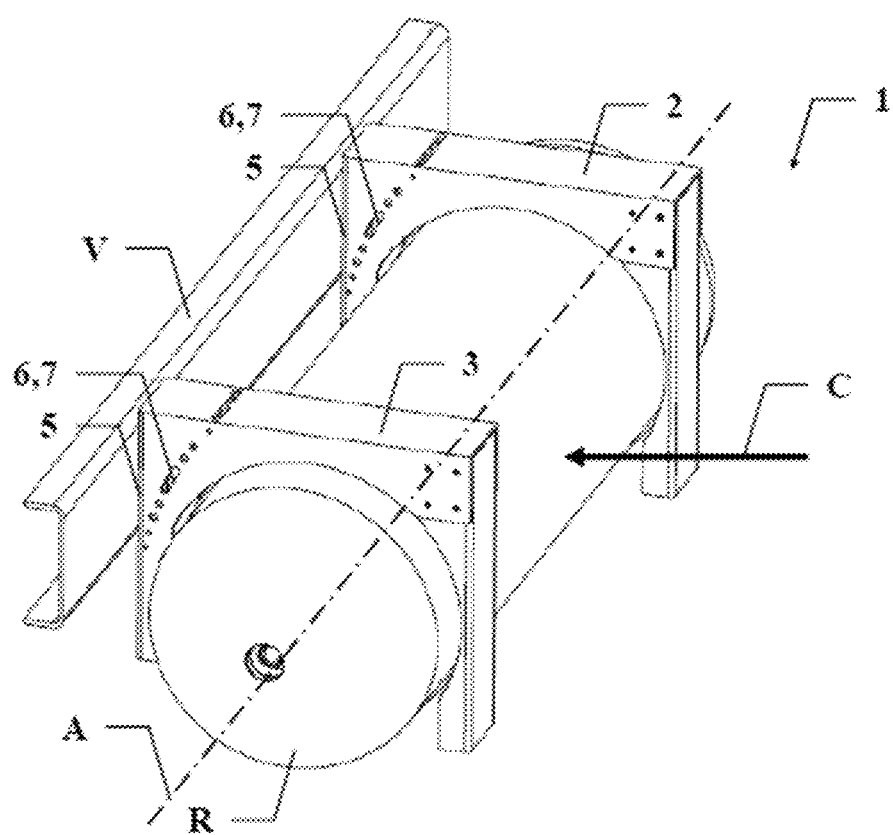
FIG. 1 shows, in perspective view, a tank fastened to a vehicle by a device according to the disclosure.

With reference to FIG. 1, the disclosure relates to a device 1 for fastening a tank R to a vehicle V.

The tank R presents a substantially cylindrical shape. The cylinder extends according to an axis A and is terminated, at each end of the cylinder by a hemispherical cap. The tank R is, for example, intended to contain gas under pressure, such as hydrogen. This hydrogen can be used by the vehicle V directly as fuel for a thermal engine or to feed a hydrogen cell producing electricity for an electric motor.

The tank R is arranged on the periphery of the vehicle V, its axis A being substantially horizontal. Because of its position on the periphery, the tank R is potentially subject to impact with another vehicle.

The tank R is fixed to the vehicle V, typically on a horizontal side member, by a fastening device 1. The fastening device 1 must ensure that the tank R is held in place under all normal driving conditions of the vehicle V. Furthermore, due to the possibility of an impact, the device 1 is also designed to protect the tank R. For this purpose, the device 1 forms a protective cage around the tank R. In addition, the device 1 is designed so that the said cage, without deforming, can move, relative to the vehicle V, in such a way as to dissipate the energy of the impact, and this preferably by ensuring that the tank R is moved to a more protected place, for example under the vehicle V.

For this purpose, the device 1 comprises at least two frames 2, 3. One frame 2, 3 is able to enclose the tank R in order to hold it. It is also suitable for being fastened to the vehicle V. The said at least two frames 2, 3 are substantially identical, substantially flat, and arranged substantially perpendicular to the axis A. It follows that the frames 2, 3 are parallel to each other. The frames 2, 3 are spaced, preferably evenly, along the axis A of the tank R and advantageously arranged symmetrically relative to the tank R.

Each frame 2, 3 comprises an opening 4, suitable for receiving the tank R. For this purpose, the opening 4 is pierced, advantageously in a through manner, along the axis A and presents a shape substantially identical to a section of the transverse tank R, such as a section perpendicular to the axis A. Thus, the opening 4 can accommodate the tank R by enclosing it around its periphery. As will be seen below, this enclosure can advantageously be only partial.

Each frame 2, 3 also includes a fastening interface 5 to the vehicle V. The fastening interface 5 can comprise any type of fastener attachment. It may comprise, for example, at least one weld, at least one screw, at least one rivet, or any other equivalent method or structure.

Each frame 2, 3 further comprises an impact energy dissipation feature 6. The impact energy is assumed to be transmitted to the tank R according to a substantially horizontal direction C and substantially perpendicular to the axis A. The dissipation feature 6 is arranged between the opening 4, which ensures the holding of the tank R, and the fastening interface 5, which ensures the fastening of the frame 2, 3 to the vehicle V.

As illustrated in the figures, the opening 4 is advantageously arranged substantially in the center of the frame 2, 3. The frame 2, 3 may have any shape, the illustrated embodiment has a preferred substantially square shape.

According to another feature, the fastening interface 5 is not arranged in the horizontal plane through the axis A. This offset in height makes it possible to create a lever arm allowing the dissipation feature 6 to be actuated by employing its deformation and/or rupture and to allow the kinematics of the tank R to be carried out substantially according to a rotation about an axis substantially parallel to the axis A.

This offset may be upward or downward so as to achieve the stated rotation effect. According to a preferred embodiment, as illustrated in the figures, the fastening interface 5 is arranged above the horizontal plane passing through the axis A.

To this end, according to one embodiment, the fastening interface 5 is arranged, relative to the frame 2, 3, in an extreme position of the frame 2, 3, preferably in a high position, in other words at the highest point of the frame 2, 3.

Several embodiments of the dissipation feature 6 are possible. The dissipation feature 6 should dissipate the energy of the impact. For this purpose, given the high level of energy to be dissipated, the dissipation feature 6 dissipates the energy by deformation and/or rupture. This deformation and/or breakage applies, for example, to the material of an insert or sacrificial part, or to the material of the frame 2, 3 itself, as illustrated.

Given the high levels of energy to be dissipated, the deformed and/or broken material is preferably metallic, even more preferably steel. The frame 2, 3 can be made using a solid section or alternatively using a hollow tube, preferably of rectangular section, depending on the energies to be dissipated.

According to another feature, the dissipation feature 6 comprises a weakened zone 7 of the frame 2, 3 between the opening 4 and the fastening interface 5. It goes without saying that the weakened zone 7 can be made of material with the frame 2, 3 or in a dedicated part (sacrificial part) integrated into the frame 2, 3.

According to another feature, the weakened zone 7 follows a line separating the opening 4 from the fastening interface 5.

The weakened zone 7 can be drawn in different alternative or complementary ways. Advantageously, the weakened zone 7 lies substantially in a plane parallel to the axis A. According to a first feature, the line is complete in that it runs entirely through the frame 2, 3 from one edge to the other. According to another feature, the line is secant to a straight line joining the fastening interface 5 to the axis A. According to one preferred embodiment, this secant is substantially perpendicular to the line joining the fastening interface 5 to the axis A.

According to another feature, the weakened zone 7 is substantially bisecting the angle formed by a tangent to the opening 4 and a vertical line passing through the fastening interface 5.

According to another feature, the line is substantially circular along a circle centered on the axis A.

Figure 2:
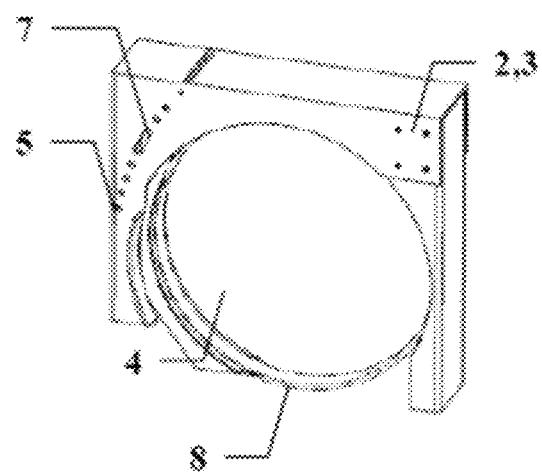
FIG. 2 shows, in perspective view, a frame.

According to another feature, the weakened zone 7 is obtained by making holes according to a drilling axis substantially parallel to the axis A. These holes are arranged along the line. They are preferably through holes relative to the frame 2, 3. They are preferably evenly distributed along the line. As illustrated in FIGS. 1 and 2, the holes can also be made on the edge of the frame 2, 3, always according to the line/plane defining the weakened zone 7.

Figure 3:
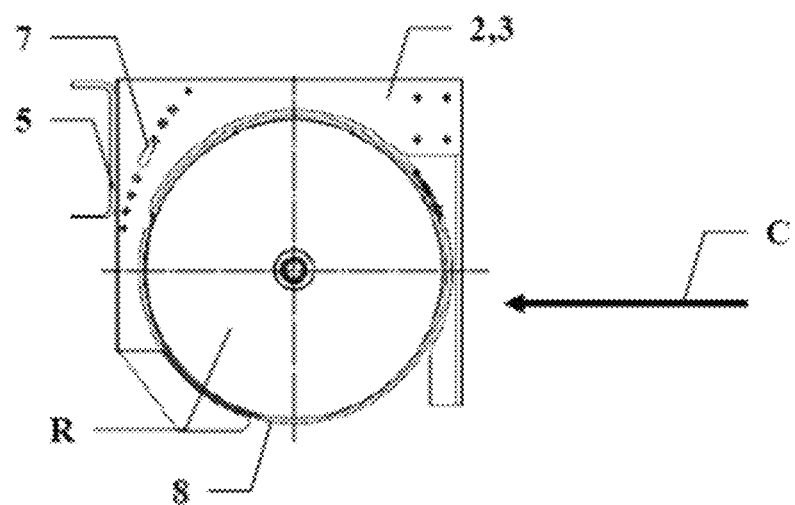
FIGS. 3, 4 and 5 show, in front view, three stages of kinematics following a side impact.
Figure 4:
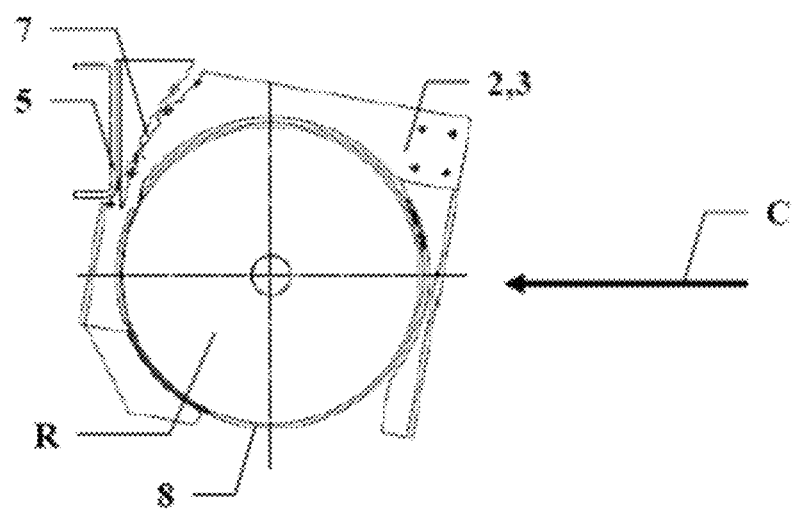
Figure 5:
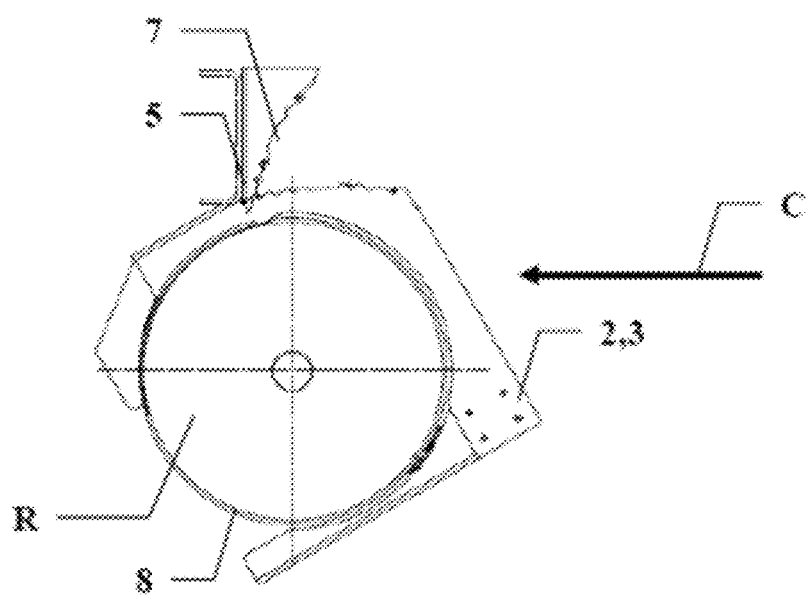

FIGS. 3-5 detail the kinematics of a tank R fastened via a device 1 to a vehicle V under the effect of an impact occurring according to the direction C. FIG. 3 illustrates the state of a frame 2, 3 before the impact. The tank R is in place in the device 1. The dissipation feature 6 is still intact, presenting no deformation. FIG. 4 illustrates the state of the frame 2, 3 during the impact. The dissipation feature 6 starts to deform, and even, in the highest area, to break, separating, one side, a part of the frame 2, 3 integral with the fastening interface 5 and which remains integral with the vehicle V, and, on the other side, a part of the frame 2, 3 integral with the tank R. FIG. 5 illustrates the state of the one frame 2, 3 at the next moment. The weakened zone 7 is completely broken, separating the part of the frame 2, 3 integral with the fastening interface 5 and the vehicle V from the other part of the frame 2, 3 integral with the tank R. The tank R is thus detached from the vehicle V. During its displacement, the tank R moves, its axis A remaining substantially parallel to itself, describing in a plane perpendicular to the axis A, a substantially circular trajectory. This advantageously allows the tank R to be moved under the vehicle V in order to protect it, for example, from another impact. If the fastening interface 5 is fixed to the vehicle V by a chassis member, the tank R advantageously ends its travel under the chassis.

According to another feature, an opening 4 can be incomplete in that it does not completely enclose the tank R. This is more particularly illustrated in FIG. 2. This feature is advantageous in that it allows the tank R to be placed in the device 1 in a transverse manner according to a translation perpendicular to the axis A, rather than longitudinally by sliding the tank R in the device 1 according to a translation parallel to the axis A. Also, the device 1 is then advantageously completed by a strap 8 completing the opening 4, so as to, in cooperation with the frame 2, 3, completely enclose the tank R.

Figure 6:
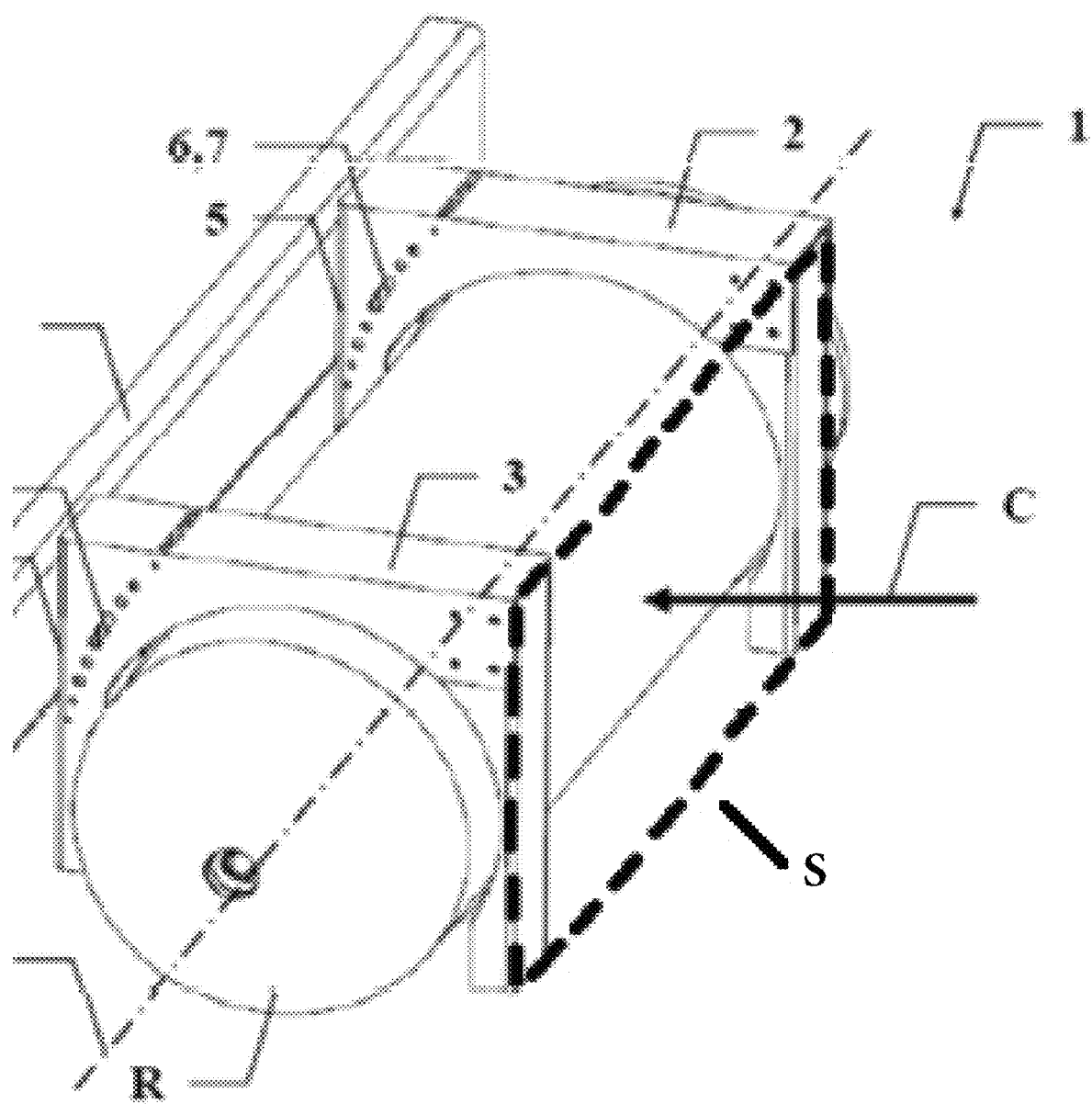
FIG. 6 schematically shows a shield that connects two frames.

According to another feature, the device 1 further comprises a shield S (schematically shown in FIG. 6), connecting the two frames 2, 3, preferably according to a vertical plane. This shield S is advantageously fixed on the outer face of the device 1 so as to be interposed between the shock and the tank R so as to receive the impact of the shock and to distribute it on the frames 2, 3 while avoiding a direct shock on the tank R. This shield S, by connecting said at least two frames 2, 3 further stiffens the device 1, so as to guarantee the integrity of the tank R. Thus, the frames 2, 3, together with the shield S, form a rigid cage protecting the tank R. Thus, it is the frames 2, 3, shield S and tank R assembly that separates it from the vehicle V, leaving only the part of the frames 2, 3 located, relative to the line of the weakened zone 7, on the side of the fastening interface 5, integral with the vehicle V.

The disclosure further relates to a vehicle V comprising a pressurized gas tank R, the tank R of which is attached to the vehicle V by a fastening device 1 according to any of the preceding claims.

The disclosure has been illustrated and described in detail in the drawings and the preceding description. The latter should be considered as illustrative and given as an example and not as limiting the disclosure to this description alone. Many alternative embodiments are possible.

LIST OF REFERENCE SIGNS

1: device,
2, 3: frame,
4: opening,
5: fastening interface,
6: impact energy dissipation feature,
7: weakened zone,
8: strap,
A: axis,
C: direction of impact,
R: tank,
V: vehicle
S: shield.

The invention claimed is:

1. A device for fastening a tank, having a shape of a cylinder according to an axis, to a vehicle, the axis being arranged horizontally, wherein the device comprises:
at least two identical flat frames, perpendicular to the axis, comprising an opening presenting a shape identical to a cross-section of the tank perpendicular to the axis so as to be able to enclose, at least partially, the tank, a fastening interface to the vehicle and an impact energy dissipation feature to dissipate impact energy transmitted to the tank according to a horizontal direction perpendicular to the axis, arranged between the opening and the fastening interface; and
wherein the impact energy dissipation feature comprises a weakened zone of at least one frame of the at least two identical flat frames, the weakened zone being between the opening and the fastening interface.

2. The device according to claim 1, wherein the fastening interface is not arranged in a horizontal plane passing through the axis and is arranged above the axis.

3. The device according to claim 1, wherein the impact energy dissipation feature dissipates energy by deformation and/or breakage.

4. The device according to claim 1, wherein the weakened zone follows a line separating the opening and the fastening interface.

5. The device according to claim 4, wherein the line runs from one edge of the at least one frame to the other and is secant to a line joining the fastening interface to the axis.

6. The device according to claim 4, wherein the line is bisecting an angle formed by a tangent to the opening and a vertical line passing through the fastening interface.

7. The device according to claim 4, wherein the line is circular centered on the axis.

8. The device according to claim 4, wherein the weakened zone comprises holes parallel to the axis, arranged along the line.

9. The device according to claim 1, wherein an opening is incomplete in that the opening does not completely enclose the tank and wherein the device further comprises a strap completing the opening.

10. The device according to claim 1, further comprising a shield, connecting the at least two identical flat frames.

11. A vehicle comprising a tank of pressurized gas, wherein the tank is fixed to the vehicle by the device according to claim 1.

12. The device according to claim 10, wherein the shield is positioned on a side of the tank that is opposite of the fastening interface.

13. The device according to claim 1, wherein the tank has a vehicle side at the fastening interface and an external side facing opposite the vehicle side, and wherein the at least two identical flat frames substantially surround the tank such that portions of each frame extends at least from the vehicle side and around an outer periphery of the tank to the external side.

14. The device according to claim 13, wherein each frame includes the weakened zone.

15. The device according to claim 13, wherein each frame includes at least a first portion extending along the vehicle side of the tank and a second portion extending from the first portion over the outer periphery of the tank to the external side of the tank, and wherein the weakened zone extends along a path from the first portion to the second portion.

16. The device according to claim 15, wherein the weakened zone comprises a plurality of holes arranged along the path, and wherein at least some holes of the plurality of holes extend along respective axes that are parallel to the axis of the cylinder.

* * * * *